Jan. 7, 1936.  H. M. JENSEN  2,026,537
NAVIGATIONAL INSTRUMENT
Filed Dec. 16, 1933  2 Sheets-Sheet 1

INVENTOR
HENRY M. JENSEN
BY
ATTORNEY

Jan. 7, 1936.  H. M. JENSEN  2,026,537

NAVIGATIONAL INSTRUMENT

Filed Dec. 16, 1933  2 Sheets-Sheet 2

INVENTOR
HENRY M. JENSEN
BY
Harold Dodd,
ATTORNEY

Patented Jan. 7, 1936

2,026,537

UNITED STATES PATENT OFFICE 2,026,537

NAVIGATIONAL INSTRUMENT

Henry M. Jensen, United States Navy

Application December 16, 1933, Serial No. 702,722

8 Claims. (Cl. 33—76)

(Granted under the act of March 3, 1883, as amended April 30, 1928; 370 O. G. 757)

This invention relates to a device for solving navigational problems, particularly those arising from the navigation of aircraft. It is among the objects of this invention to provide a simple, low cost apparatus that may be utilized in the solution of a large number of navigational problems without the use of compasses, straight edges or other accessories.

With the above and other objects in view, this invention consists in the construction, combination and arrangement of parts as will be described more fully hereinafter.

Figure 1:
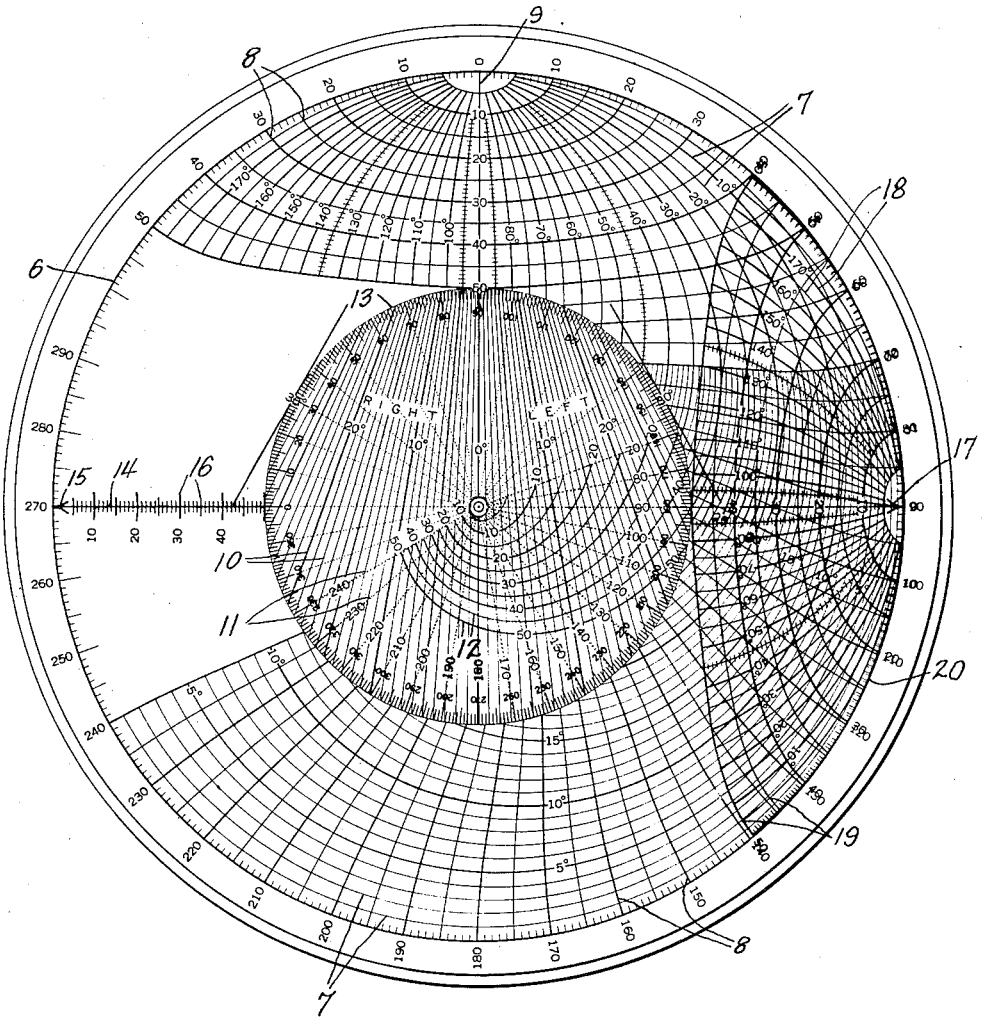
Fig. 1 is a top plan view of my invention.
Figure 2:
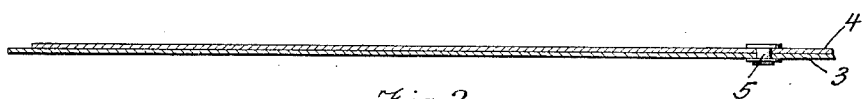
Fig. 2 is a partial diametral section thereof.

The apparatus consists of a base 3 of cardboard or other suitable material to which is pivoted a transparent disk 4 by means of a pin 5, the disk being preferably of celluloid or the like material having a roughened surface that will readily take a pencil mark.

For solving problems involving wind direction and velocity, air speed, ground speed and drift, it is desirable to have a plurality of lines converging to a common point and spaced at equal angles from each other intersected by equally spaced circles having a common center at the point of convergence of the aforesaid lines, the first mentioned group of lines being used to indicate wind direction and velocity and the circles to indicate the speeds, both air and ground, of the craft. This type of diagram is adapted to cooperate with a rotating element by making a circular projection of the two sets of lines. This projection on the base 3 of my instrument is represented by the base line 6 in the form of a circle and the other of the first mentioned group of converging lines forming spirals within the circle as shown by the series of lines 7. It will be noted that line 9, the medial one of the lines 7, is a straight line passing through the center of rotation of disk 4. The projection of the above mentioned equally spaced circles is constituted by lines 8 that intercept equal arcs upon the circle 6 and equal segments upon the medial line 9. Also inscribed upon base 3 are a plurality of lines 10 that are separated from each other by equal angles and converge to a common point which, for convenience in the present instance, has been made the same as the point of convergence of the lines 7 but any other point may be used depending upon the scale desired. That one of the lines 10 that passes through the axis of rotation of disk 4 has been made the zero line and those on each side thereof have been labeled respectively "Right" and "Left" to indicate the direction of drift, the magnitude of the drift being shown by the lines 10. A plurality of lines 11 spaced at equal angles radiate from the axis of rotation of disk 4 and are numbered from 70 to 240 to represent aircraft speeds. A series of spiral lines 12 disposed about said axis intersect the radiating lines 11 and are spaced from each other in such manner that the ratio of the distance between any two adjacent lines 12 at any point to the distance between the same two lines at any other point is inversely proportional to the respective air speeds for those two points as shown by the lines 11.

Upon disk 4 is inscribed a compass rose 13 whereof the radial line through the zero point is continued by a line 14 having an arrow 15 at its radially outer end and is graduated by lines 16 in terms of wind velocities. A like radial line having an arrow 17 at its outer end passes through the 180° mark of the compass rose, and about the point of intersection of the said like line with an arc 20 concentric with disk 4 and having the same radius as circle 6 there are inscribed two sets 18 and 19 of intersecting lines identical with the series 7 and 8 on the base in the vicinity of the point of convergence of lines 7.

The method of laying out the various curves and lines on the instrument will now be described. The device consists essentially of two separate diagrams which have been combined in one instrument for convenience.

Figure 3:
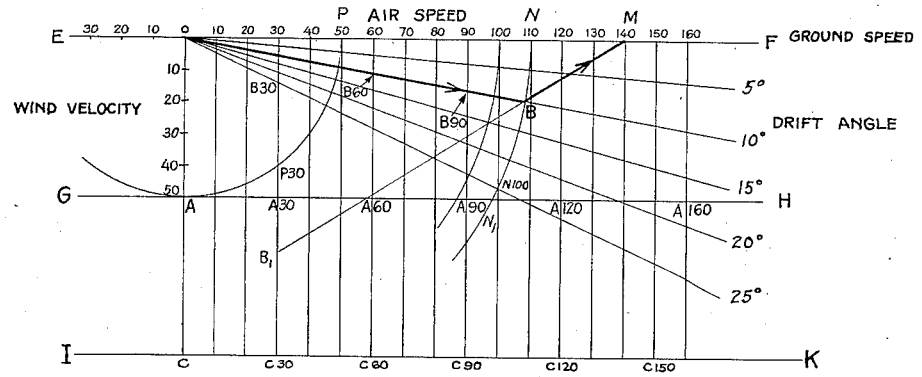
Figs. 3 and 4 show the method of developing the curves on the instrument.
Figure 4:
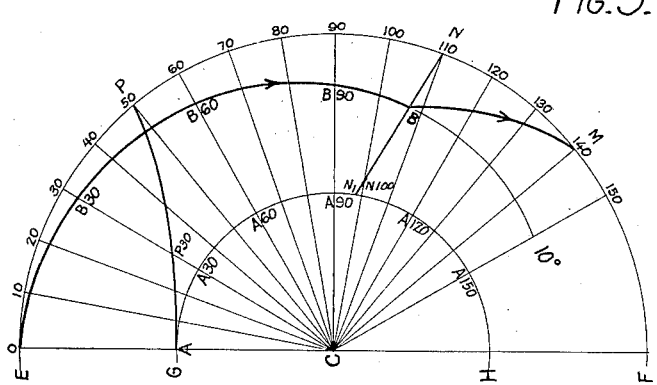

The development of lines 6, 7 and 8 is illustrated in Figs. 3 and 4. In the straight line diagram of Fig. 3, the line 0M represents the ground speed of an airplane which is traveling at an air speed represented by the line 0B with a wind velocity represented by the line BM at a relative angle to the desired course represented by the angle FMB, the relative angle being measured from the course clockwise to the line forming the other side of the angle in question. The angle BOM then represents a drift angle between the true course steered by the plane and the course actually made good over the ground.

The obvious construction of a device suitable for the universal solution of the air triangle would employ straight lines, with a base diagram having straight lines radiating from 0 to represent each degree of drift angle and with a series of airplane speed circles such as PA and NBN₁ may be used in conjunction with a similar diagram drawn on a transparent material having radiating straight lines to represent relative wind angles and circles to represent wind velocities. The base and the transparent wind diagrams must be so secured together that the base line EF of the wind diagram will superimpose accurately on the corresponding line of the base and at the same time the wind diagram must be free to slide to right and left. A device constructed in this manner will be difficult to maintain in accurate alignment, will be relatively large in size, and will be unsuited for combination with the parts of the instrument used for determination of wind direction and velocity from observed drift angles on two courses.

To obviate the above difficulties a circular projection of the airplane speed and drift angle diagram is developed as shown in Fig. 4, all parts of which are lettered the same as the corresponding parts of Fig. 3. The circle EPNMF corresponds to the straight ground speed line similarly lettered in Fig. 3, the circle GAH corresponds to the straight line GAH, and all points C, C30, C60, etc., of the line IK become the point C, the center of the circles. All vertical lines of Fig. 3 become correspondingly numbered radii of the circles in Fig. 4. The straight line 0B in Fig. 3 is shown developed as the spiral 0B in Fig. 4, distances from the circle along the radii being equal to the corresponding distances from the line EF on vertical lines 10, 20, 30, etc., giving the lines 7 of Fig. 1. The curves PA and NBN₁, representing airplane speeds on Fig. 4, are developed by laying off on the radii 0, 10, 20, etc., distances equal to the distances of intersection of the circles PA and NBN from base line EF, with the corresponding vertical lines 0, 10, 20, etc., in Fig. 3, and these give the lines 8 of Fig. 1. For the sake of simplicity in explanation only the lines specifically mentioned above have been shown developed in Figs. 3 and 4. The completed diagram shows spirals and curves for all probable drift angles and airplane speeds. As wind velocities above 50 miles will seldom be encountered, the portion of the diagram inside of the circle GAH is used for another set of curves. The wind velocity and relative angle diagram comprising the lines 18 and 19 on the transparent disk is developed in exactly the same manner as the airplane speed and drift angle diagram just described. The line BM represents one line of this diagram, the disk having been turned so that the point M is at the position on the circle representing the ground speed and the point B then shows the intersection of the drift angle curve of the base and the relative wind angle curve of the disk. By various setups, when any three of the vectors, airplane speed, drift angle, ground speed, wind velocity, and relative angle of wind are known, the other two may be readily determined. For simplicity, it is more convenient in some cases to use the arrow 15 of Fig. 1 placed over the line 9 for marking the known wind vectors on the disk in pencil than to use a developed wind angle and velocity diagram about the arrow at 17.

Figure 5:
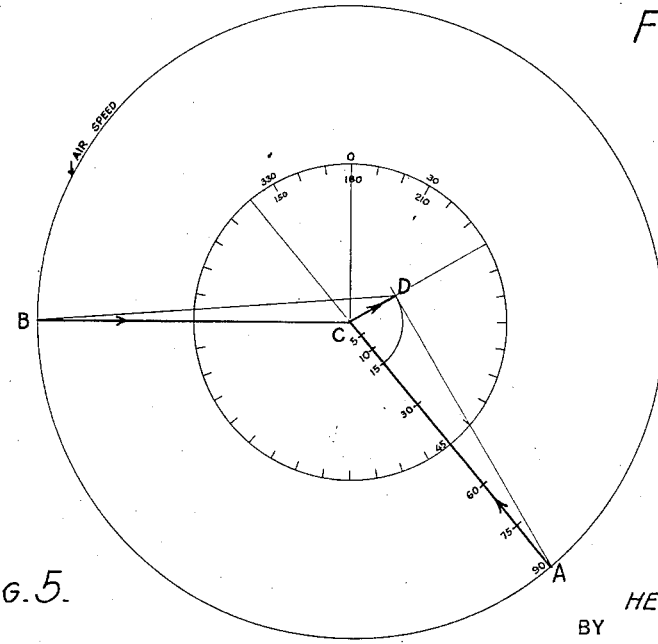
Fig. 5 is explanatory of the use of the instrument in determining the wind vector by flying two courses and measuring the drift angles.

The development of the device for determination of the true wind direction and velocity from observations of the drift angles of a plane flown at a constant speed on two known courses is shown in Fig. 5. The problem illustrated is that given below in the first paragraph under the method of using my invention.

In Fig. 5, the numerals on the outside of the inner circle whose center is at C represent degrees of a true compass rose. The radius of this inner circle may be of any convenient length. An outer circle is drawn using the same center, the radius of which represents the air speed of the plane, using any desired scale. The line AC then represents the course and speed of a plane flying on course 320° and at an air speed of 90 miles per hour. This line prolonged intercepts the inner circle at the graduation for 320°. As the drift is 10° right, the line AD, drawn at an angle of 10° to the right looking in the direction of flight, represents the actual course of the plane over the ground. The wind direction and velocity are indeterminate with one observation for drift as the wind vector may be any line from the point C intercepting the line AD. However, with the plotting of the second course BC representing the plane on course 90°, air speed 90, with its drift angle BCD showing a drift of 5° left, the line CD is the only line which will represent a wind direction and velocity common to both angles of drift. From observation of the diagram, it is noted that the wind blows toward 52° true or away from 232° true. As the lines AC and BC represent an air speed of 90 miles, the scale of measure for the line CD is the same as for line AC. The line CD is thus found to represent a wind velocity of 16 miles. As the course of the plane is the direction toward which it flies while the wind direction is the direction from which it blows, it is more convenient from a construction standpoint to use the numbers on the inner side of the circle which are 180° from the true compass rose on the outer side of the circle, the lines AC and BC intercepting the circle at 320° and 90° respectively of this inner rose and the line CD pointing to 232°. It is obvious that the scale may be changed to adapt the instrument to any air speed.

In the development of the device for practical and convenient use, the compass rose 13 corresponding to the inner compass rose of Fig. 5 is printed on the rotatable disk, while on the base is printed a diagram consisting of the medial line 9 through the center, with the lines 10 drawn at equal angles to converge to a common point whose distance from the pivot corresponds to the radius of the outer circle of Fig. 5. Also, on the base, there is developed a series of scales for the measurement of wind velocity, the units of each scale being equal to the radius AC divided by the various air speeds. For convenience, spirals 12 are drawn between the points of the various scales representing speeds of 5 miles, 10 miles, etc. The scales have been developed for increments of 10 miles in air speeds from 70 miles to 240 miles. It is obvious from an elementary vector diagram that the effect of wind in producing drift is inversely proportional to the air speed of the craft.

In the use of the device all plotting is done on the disk 4. It will be noted from Fig. 5 that the only essential lines to be drawn are AD and BD, and only sufficient of each of these to give the point of intersection D being required, this point D giving the direction and velocity of the wind. When the disk is rotated so that the 320° mark of the compass rose lies over the median line of the base, the essential part of the line AD is readily drawn in pencil on the roughened surface of the disk by following the line 11 on the base corresponding to the drift angle of 10° right; similarly BC is set over the median line and BD drawn to intersect AD at D. The wind direction 232° is now read directly by the position of the point D with reference to the compass rose and the wind velocity is determined by rotating the disk until the point D coincides with the air velocity scale corresponding to 90 miles and it is then seen that the wind velocity is 16 miles.

The method of using my invention is as follows:

To determine wind direction and velocity the aircraft flies two known courses at a known air speed and the drift angle on each course is noted. Disk 4 is rotated to set compass rose 13 so that the point on compass rose 13 representing the first course flown coincides with line 9 and a pencil mark is made along that one of lines 10 representing the magnitude of the observed angle of drift on that course, due regard being had to whether the drift were left or right. Disk 4 is then again rotated likewise to set compass rose 13 to indicate the second course flown and a second line is drawn along the line 10 representing the angle of drift on the second course. The intersection of the two drift lines then gives the direction of the wind on compass rose 13. To solve for the wind's velocity, the point of intersection of the two drift lines is set, by rotating disk 4, over the line 11 representing the air speed and the wind velocity is then shown by the position of the point of intersection of the drift lines with respect to wind velocity lines 12. For example: First course flown 320°, air speed 90 and drift right 10°, and second course 90°, air speed 90 and drift left 5°. Set the 320 mark on compass rose 13 in coincidence with line 9 and draw on disk 4 a line along the line 10 marked 10° on the side labelled "Right"; turn disk 4 to set the 90 mark on compass rose 13 in coincidence with line 9 and draw on disk 4 a line along the "Left" 5° line; the intersection of these two drawn lines is between the 230 and 240 lines of the compass rose and gives the wind direction as 232°. Disk 4 is then rotated until the point of intersection of the two drift lines is over the radial line in group 11 numbered 90, which is the air speed of the craft. Referring to the spiral lines 12 it will be noted that the drift line intersection lies just off the 15 unit line and the wind velocity is therefore about 16 units per hour, being the same unit as the air speed of the craft whether knots or miles.

The lines 7 and 8 on base 3 when used in conjunction with line 14 on disk 4 may be used to determine any two of the following quantities: Air speed, ground speed, relative wind angle, wind velocity and drift angle, when the other three are known. If the relative wind angle, wind velocity and air speed are known, the drift angle and ground speed are determined as follows: Set disk 4 with line 15 coinciding with line 9. A mark is made on disk 4 at the point indicating the relative wind angle as shown by lines 7, and the wind velocity as shown by lines 8. Disk 4 is then rotated until the mark made thereon coincides with the line 8 that passes through the calibration on circle 6 representing the air speed; the drift angle is then indicated by the position of the mark with respect to the lines 7 and the ground speed is shown by the position of arrow 15 on circle 6.

To determine relative wind angle and velocity from the known ground speed, air speed and drift angle: Set arrow 15 at the calibration on circle 6 representing the ground speed and mark on the disk the point defined by the intersection of line 7 showing the drift angle and the line, as read from the calibrations on circle 6, representing the air speed. Disk 4 is then revolved until line 14 coincides with line 9 and the position of the mark will show the relative wind angle read from lines 7 and the wind velocity, read from lines 8.

My invention may also be used to determine the compass correction necessary to parallel a given course when the total miles flown and the distance off course are known. This is done by setting the calibration line 16 corresponding to the distance off course over the line 8 on base 3 corresponding to the distance flown. The compass correction necessary is then read by the position of the said calibration line 16 with respect to lines 7.

The sets of lines 18 and 19 on disk 4, corresponding to the sets of lines 7 and 8 in the vicinity of the zero point on base 3, may be used for determining the quantities for which the lines 7 and 8 are utilized by rotating disk 4 until the desired point within the area covered by lines 17 and 18 overlies the point on base 3 that is involved in the particular calculation, thus requiring no pencil. That is, instead of rotating line 15 into coincidence with the line 9, marking on disk 4 a point corresponding to the intersection of a line 7 with a line 8 and rotating the disk to bring the end of line 15 into position to take a reading indicated by said point, the arrow 17 may be turned to position to take the reading and the reading be made under the intersection of lines 18 and 19 corresponding to the proper intersection of lines 7 and 8.

The invention herein described may be manufactured and used by or for the Government of the United States of America for governmental purposes, without the payment of any royalties thereon.

I claim:

1. A navigational instrument, comprising a base and a transparent disk rotatably mounted thereon; said disk having on it a radial line graduated over at least a portion of its length and a compass rose concentric with the mounting of said disk and having its zero point on said radial line; said base having on it a first group of lines radially disposed about the center of rotation of said disk to represent air speeds, a second group of lines spirally disposed around said center and intersecting the said first group, the spacing between any two adjacent lines of the second group at any point having a ratio to the spacing between the same two lines at any other point that is inversely proportional to the air speeds represented by those points, a third group of lines constituting the circular projection of a plurality of lines that meet in a common point and have equal angles between each two adjacent lines, the base line of said third group forming a circle, a fourth group of lines intersecting said third group in a manner to intercept equal arcs on said circle and equal segments on the median line of the third group, the lines of said third group being adapted to represent air or ground speeds and wind velocity and the lines of said fourth group being adapted to represent relative wind angles, and a fifth group of lines separated by equal angles and converging to a common point to represent drift angles, there being on said disk a duplication of a portion of the lines of the third and fourth groups adjacent the point of convergence of the lines of said third group and having a point of convergence on a radial line.

2. A navigational instrument, comprising a base and a transparent disk rotatably mounted thereon, there being on said disk a compass rose and on said base a plurality of convergent lines spaced at equal angles from each other with the medial one passing through the axis of said disk, a plurality of spirally disposed lines about said axis intersecting said convergent lines and a plurality of lines spaced at equal angles radiating from said axis, the said rose and three sets of lines being conjointly usable to determine the wind direction and wind velocity when the air speeds and the angles of drift on two different courses flown are known; said disk having on it a graduated radial line and said base having on it the circular projection of a series of lines converging to a common point and separated by equal angles and of a series of equidistantly spaced circles intersecting the lines of said series and having their common center at said point of convergence, the said radial line and the said projection of the series of lines and circles being conjointly usable to determine any two quantities of the group: air speed, ground speed, relative wind angle, wind velocity, and drift angle, when the other three are known.

3. A navigational instrument, comprising a base and a transparent disk rotatably mounted thereon, there being on said disk a compass rose and on said base a plurality of convergent lines spaced at equal angles from each other with the medial one passing through the axis of said disk, a plurality of spirally disposed lines about said axis intersecting said convergent lines and a plurality of lines spaced at equal angles radiating from said axis, the said rose and three sets of lines being conjointly usable to determine the wind direction and wind velocity when the air speeds and the angles of drift on two different courses flown are known.

4. A navigational instrument, comprising a base and a transparent disk rotatably mounted thereon; said disk having on it a graduated radial line and said base having on it the circular projection of a series of lines converging to a common point and separated by equal angles and of a series of equidistantly spaced circles intersecting the lines of said series and having their common center at said point of convergence, the said radial line and the said projection of the series of lines and circles being conjointly usable to determine any two quantities of the group: air speed, ground speed, relative wind angle, wind velocity, and drift angle, when the other three are known.

5. A navigational instrument, comprising a base and a transparent disk rotatably mounted thereon; there being on said disk a compass rose and on said base a plurality of convergent lines spaced at equal angles from each other with the medial one passing through the axis of said disk, a plurality of lines spaced at equal angles radiating from said axis to represent air speeds and a plurality of lines spirally disposed around said axis and intersecting said radiating lines, the distance between any two adjacent spirally disposed lines at any point having a ratio to the spacing of the same two lines at any other point that is inversely proportional to the air speeds represented by those points, the said compass rose and three groups of lines being conjointly usable to determine the wind direction and velocity when the air speeds and the angles of drift on two different courses flown are known.

6. A navigational instrument, comprising a base and a transparent disk rotatably mounted thereon, said disk having on it a graduated radial line and said base having on it the circular projection of a series of lines converging to a common point and separated by equal angles, the base line of said series thus forming a circle and the other lines of the series forming spirals therein, there being on the base the circular projection of a series of equidistant circles intersecting the lines of said series and having their common center at the said common point, the said radial line and the lines of the two said projections being conjointly usable to determine any two quantities of the group: air speed, ground speed, relative wind angle, wind velocity, and drift angle, when the other three are known.

7. A navigational instrument, comprising a base, having on it a plurality of radial lines of equal length extending from the center at equal angular intervals, said lines representing speeds of a craft, a plurality of spiral lines around said center representing speeds of movement of the medium by which the craft is borne, said spirals intersecting said radial lines, and a unit of spacing between spirals on any of said radial lines being the quotient of length of such line divided by the speed represented by that line, a family of lines at equal angular intervals on each side of the line through said center converging to a common point on said line through the center and spaced from the center, and a transparent member mounted on said base to rotate about said center, said member being markable with indications in accordance with the lines of said family under known conditions, and rotatable to superimpose such markings on such spiral lines.

8. A navigational instrument, comprising a base having thereon the circular projection of a straight base line, a plurality of circles having a common center on said base line and a family of lines equally angularly spaced from each other to converge to said center, said base line becoming in said projection a circle, the lines in said family becoming spirals with a common origin at said center, and said circles becoming series of curved lines having intercepts on equally spaced radii of the base line circle equal to the intercepts of these circles on perpendiculars to the straight base line, which perpendiculars are spaced apart by distances equal to the linear distance on the base line circle between corresponding radii.

HENRY M. JENSEN.